US011012807B2

(12) United States Patent
Shepherd et al.

(10) Patent No.: US 11,012,807 B2
(45) Date of Patent: *May 18, 2021

(54) LOCATION SERVICE MANAGEMENT

(71) Applicant: Apple Inc., Cupertino, CA (US)

(72) Inventors: Matthew E. Shepherd, Mountain View, CA (US); Ronald K. Huang, San Jose, CA (US); Stephen J. Rhee, San Jose, CA (US); Daniel T. Kurtz, Cupertino, CA (US); Erik Neuenschwander, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/433,523

(22) Filed: Jun. 6, 2019

(65) Prior Publication Data

US 2020/0076942 A1 Mar. 5, 2020

Related U.S. Application Data

(63) Continuation of application No. 16/193,765, filed on Nov. 16, 2018, now abandoned, which is a
(Continued)

(51) Int. Cl.
*H04W 4/021* (2018.01)
*H04W 12/63* (2021.01)
(Continued)

(52) U.S. Cl.
CPC ....... *H04W 4/021* (2013.01); *H04M 1/72463* (2021.01); *H04M 1/72469* (2021.01);
(Continued)

(58) Field of Classification Search
CPC ......... H04M 1/72577; H04M 1/72583; H04M 1/72463; H04M 1/72469; H04W 4/021;
(Continued)

(56) References Cited

U.S. PATENT DOCUMENTS 8,686,852 B2 4/2014 Ben-Dayan et al.
8,755,824 B1 6/2014 Wang et al.
(Continued)

OTHER PUBLICATIONS

IOS 8 prompts users to continue allowing apps to use their location [online] by Jason, dated Jun. 6, 2014 [retrieved on Mar. 19, 2019], retrieved from the Internet:<URL: http://www.iphonehacks.com/2014/06/ios-8-continue-location-alert.html> (Year: 2014).
(Continued)

*Primary Examiner* — Yuwen Pan
*Assistant Examiner* — Hung K Du
(74) *Attorney, Agent, or Firm* — Jaffery Watson Mendonsa & Hamilton LLP

(57) ABSTRACT

An application manager of a mobile device can provide a user with the ability to control whether an application can use location information provided by a location subsystem of the mobile device. The application can request to be notified by the location subsystem when the mobile device crosses a geofence. When the mobile device crosses the geofence, the location subsystem provides a notice to the application. The application manager can intercept the notice to the application, and present an alert on a user interface. The application manager can then provide the notice to the application only upon receiving an input through the user interface confirming that the application still has permission to use location information.

20 Claims, 11 Drawing Sheets

Related U.S. Application Data continuation of application No. 15/449,817, filed on Mar. 3, 2017, now Pat. No. 10,136,252, which is a continuation of application No. 14/856,499, filed on Sep. 16, 2015, now Pat. No. 9,591,443.

(60) Provisional application No. 62/169,511, filed on Jun. 1, 2015.

(51) Int. Cl.
| | | |
|---|---|---|
| *H04M 1/725* | (2021.01) | |
| *H04W 12/02* | (2009.01) | |
| *H04W 4/02* | (2018.01) | |
| *H04W 4/029* | (2018.01) | |
| *H04W 64/00* | (2009.01) | |
| *H04M 1/72463* | (2021.01) | |
| *H04M 1/72469* | (2021.01) | |

(52) U.S. Cl.
CPC .............. *H04W 4/02* (2013.01); *H04W 4/029* (2018.02); *H04W 12/02* (2013.01); *H04W 12/63* (2021.01); *H04W 64/00* (2013.01)

(58) Field of Classification Search
CPC ........... H04W 4/029; H04W 12/00503; H04W 12/02; H04W 4/02; H04W 64/00; H04W 12/63; H04L 67/04; H04L 67/18
See application file for complete search history.

(56) References Cited

U.S. PATENT DOCUMENTS

| | | | |
|---|---|---|---|
| 8,862,092 B2 | 10/2014 | Reitnour | |
| 8,868,742 B2 | 10/2014 | Bellardie | |
| 8,891,514 B1 | 11/2014 | Chen | |
| 9,473,883 B2 | 10/2016 | Rhee et al. | |
| 9,591,443 B2 | 3/2017 | Shepherd et al. | |
| 9,720,555 B2 | 8/2017 | Sorden | |
| 10,136,252 B2 | 11/2018 | Shepherd et al. | |
| 10,244,344 B2 | 3/2019 | Rhee et al. | |
| 10,667,078 B2 | 5/2020 | Rhee et al. | |
| 2004/0160909 A1 | 8/2004 | Sheynblat | |
| 2004/0176104 A1 | 9/2004 | Arcens | |
| 2004/0193707 A1* | 9/2004 | Alam | H04L 67/18 709/223 |
| 2004/0217980 A1 | 11/2004 | Radburn | |
| 2006/0064346 A1 | 3/2006 | Steenstra | |
| 2009/0221267 A1 | 9/2009 | Bender et al. | |
| 2009/0239587 A1 | 9/2009 | Negron | |
| 2010/0311399 A1 | 12/2010 | Cusick | |
| 2012/0311697 A1 | 12/2012 | Swingler et al. | |
| 2013/0036117 A1 | 2/2013 | Fisher | |
| 2013/0055387 A1* | 2/2013 | Kim | G06F 21/55 726/22 |
| 2013/0131987 A1 | 5/2013 | Soelberg | |
| 2013/0167159 A1 | 6/2013 | Ricci et al. | |
| 2013/0205385 A1* | 8/2013 | Roesner | G06F 21/6245 726/17 |
| 2013/0326418 A1 | 12/2013 | Otsuki et al. | |
| 2014/0059695 A1 | 2/2014 | Paracki et al. | |
| 2014/0199962 A1 | 7/2014 | Mohammed et al. | |
| 2014/0207575 A1* | 7/2014 | Freed-Finnegan | G06Q 30/0641 705/14.58 |
| 2014/0282234 A1 | 9/2014 | Ku et al. | |
| 2015/0100887 A1 | 4/2015 | Verkasalo | |
| 2015/0121464 A1 | 4/2015 | Hughes, Jr. | |
| 2015/0141055 A1 | 5/2015 | Barrand | |
| 2015/0201245 A1 | 7/2015 | Lau | |
| 2015/0257004 A1 | 9/2015 | Shanmugam | |
| 2015/0294396 A1 | 10/2015 | Goodwin | |
| 2015/0350823 A1 | 12/2015 | Rhee et al. | |
| 2015/0350827 A1 | 12/2015 | Birch et al. | |
| 2016/0165405 A1 | 6/2016 | Shinozuka | |
| 2016/0165415 A1 | 6/2016 | Cuomo | |
| 2016/0191534 A1* | 6/2016 | Mallozzi | G06F 21/629 726/4 |
| 2016/0232137 A1* | 8/2016 | Liu | G06Q 10/107 |
| 2016/0353237 A1 | 12/2016 | Shepherd et al. | |
| 2017/0230787 A1 | 8/2017 | Rhee et al. | |
| 2017/0272904 A1 | 9/2017 | Shepherd et al. | |
| 2019/0191269 A1 | 6/2019 | Shepherd et al. | |
| 2019/0215642 A1 | 7/2019 | Rhee et al. | |
| 2019/0289423 A1 | 9/2019 | Rhee et al. | |

OTHER PUBLICATIONS

Background Location Update Programming for iOS 7 and iOS 8 [online] by Ricky, dated Jan. 10, 2014 [retrieved on Mar. 19, 2019], retrieved from the Internet:<URL: http://mobileoop.com/background-location-update-programming-for-ios-7> (Year: 2014).

Arpacelli, "Geofencer," Android App, Oct. 13, 2014, 4 pages.

Apple, "iOS 7: Understanding Location Services," Apple ios 7, Feb. 3, 2015, 8 pages.

* cited by examiner

LOCATION SERVICE MANAGEMENT

CROSS-REFERENCE TO RELATED APPLICATION

This application is a continuation of and claims priority to U.S. application Ser. No. 16/193,765, entitled "Location Service Management," filed on Nov. 16, 2018, which is a continuation of and claims priority to U.S. application Ser. No. 15/449,817, entitled "Location Service Management," filed on Mar. 3, 2017, which is a continuation of and claims priority to U.S. application Ser. No. 14/856,499, entitled "Location Service Management," filed on Sep. 16, 2015, now U.S. Pat. No. 9,591,443, issued on Mar. 7, 2017, which claims priority to U.S. Provisional Patent Application No. 62/169,511, entitled "Location Service Management," filed Jun. 1, 2015, the entire contents of each of which are incorporated herein by reference.

TECHNICAL FIELD

This disclosure relates generally to managing access to location service information by applications.

BACKGROUND

Modern mobile devices (e.g., smart phones, tablet computers, wearable devices) often include location services. A location service provides location data to applications running on the mobile device. The location data can be provided by satellite-based or network-based positioning systems. For example, a Global Positioning System (GPS) receiver can be embedded or coupled to the mobile device that provides GPS data (e.g., latitude, longitude) to the location service. Additionally, radio frequency (RF) signals from access points, beacons or cell towers can be used to determine the location of the mobile device. The location service aggregates location data from the various positioning systems and provides the location data to applications upon request.

Since the advent of location-aware devices, users have become increasingly concerned about the use of their private location data by third parties. To address this concern, mobile device manufacturers desire to provide mechanisms for allowing users to opt out of sharing their location data with applications running on the mobile device.

SUMMARY

An application manager of a mobile device can provide a user with the ability to control whether an application can use location information provided by a location subsystem of the mobile device. The application can request to be notified by the location subsystem when the mobile device crosses a geofence. When the mobile device crosses the geofence, the location subsystem provides a notice to the application. The application manager can intercept the notice to the application, and present an alert on a user interface. The application manager can then provide the notice to the application only upon receiving an input through the user interface confirming that the user authorizes the application to be notified.

An application can specify a location service authorization type to be enforced by a mobile device. After the user authorizes the location service through an authorization dialog, the application can receive location service according to the authorization type. For example, the application can specify one of several authorization types through an application programming interface (API). A first authorization type allows the application to receive continuous location updates from a location service on the mobile device only when the application is in use. In some implementations, an application is considered to be "in use" based on a variety of factors, including but not limited to when the application is visible on a display of the mobile device or when the application is invoked through a voice command (e.g., invoked using an intelligent personal assistant). A second authorization type allows the application to always receive continuous location updates and location events when the application is running in a foreground or background or caused to be running in the background.

In some implementations, an authorization dialog is presented to the user requesting authorization from the user to allow the application to receive location data. The text of the authorization dialog can be customized by the application to provide more detail on how the location data will be used by the application. In some implementations, the application can be configured to display the authorization dialog only once to the user. In some implementations, the authorization type can be specified by setting one or more keys in a file of the application, which are used in conjunction with an API to specify the authorization type and customized dialog text. In some implementations, a settings pane allows a user to set an authorization type for an application on the mobile device. In some implementations, a status indicator is displayed by the application that changes its visual appearance based on the type of location service being provided to the application. In some implementations, a status indicator provides a quick return to an application that is using the location service while the user is working in another application on the display.

Other implementations are directed to systems, devices and non-transitory, computer-readable storage mediums. Particular implementations disclosed herein provide one or more of the following advantages. Application developers have more control over how location services on a mobile device are authorized for their application. Users benefit by receiving more detail about how the location data will be used by the application so that they can make a more informed decision regarding authorization of location service. A layer between an application and location functions of a mobile device provides additional privacy protection to the user.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example User Interfaces

Figure 1A:
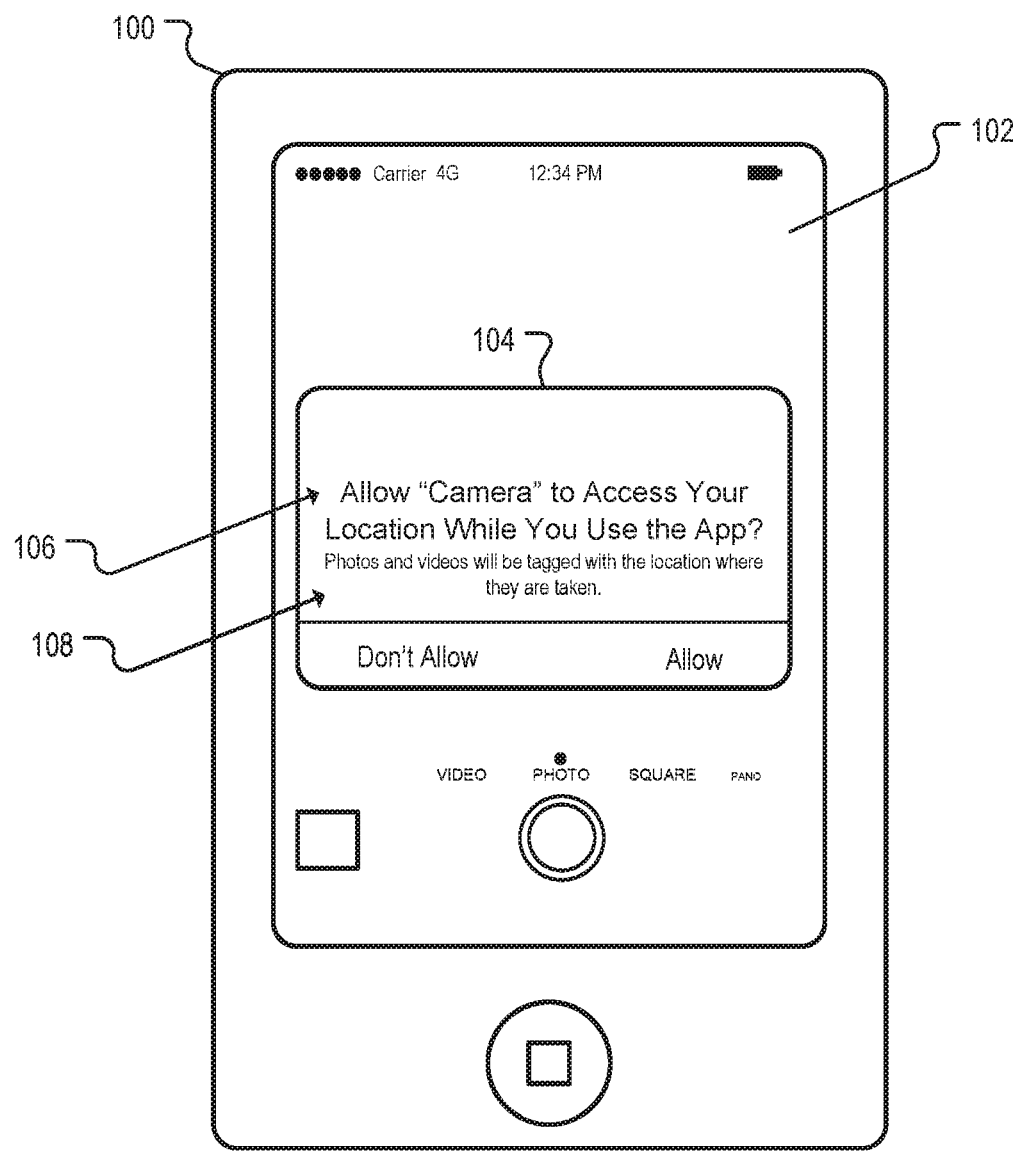
FIG. 1A illustrates an example authorization dialog to allow an application to receive location service when in use.

FIG. 1A illustrates an example authorization dialog 104 to allow a camera application to receive location service when in use. In some implementations, a display of mobile device 100 presents graphical user interface (GUI) 102 of a camera application. In this example, the camera application has specified one of "when in use" or "always" location service authorization types (hereafter also referred to as "WhenInUse" and "Always," respectively). The WhenInUse authorization type (shown in FIG. 1A) allows a location service to provide continuous location updates to the camera application if the camera application (e.g., GUI 102) is "in use." An application is considered to be "in use" based on a variety of factors including but not limited to when the application is visible on a display of the mobile device or when the application is invoked through a voice command (e.g., invoked using an intelligent personal assistant).

The Always authorization type (shown in FIG. 1B) allows the location service to provide continuous location updates and location events (e.g., a geofence crossing, significant location detection) to the application when the application is running in the foreground or background or caused to be running in the background on mobile device 100. When the application is launched, authorization dialog 104 can be presented in GUI 102. Authorization dialog 104 includes generic text 106 provided by an operating system of mobile device 100 and custom text 108 provided by the application.

In FIG. 1A, the operating system provided the generic text "Allow 'Camera' to Access Your Location While You Use the App?" and the camera application provided the custom text "Photos and videos will be tagged with the location where they are taken." Custom text 108 provided by the camera application addresses the user's privacy concerns about their location data being shared with third parties. The user is provided with user interface elements (e.g., "Don't Allow" and "Allow" buttons) to allow or not allow the camera application to use the location data. In some implementations, authorization dialog 104 is displayed only once after the camera application is launched for the first time after installation or reinstallation of the camera application.

Figure 1B:
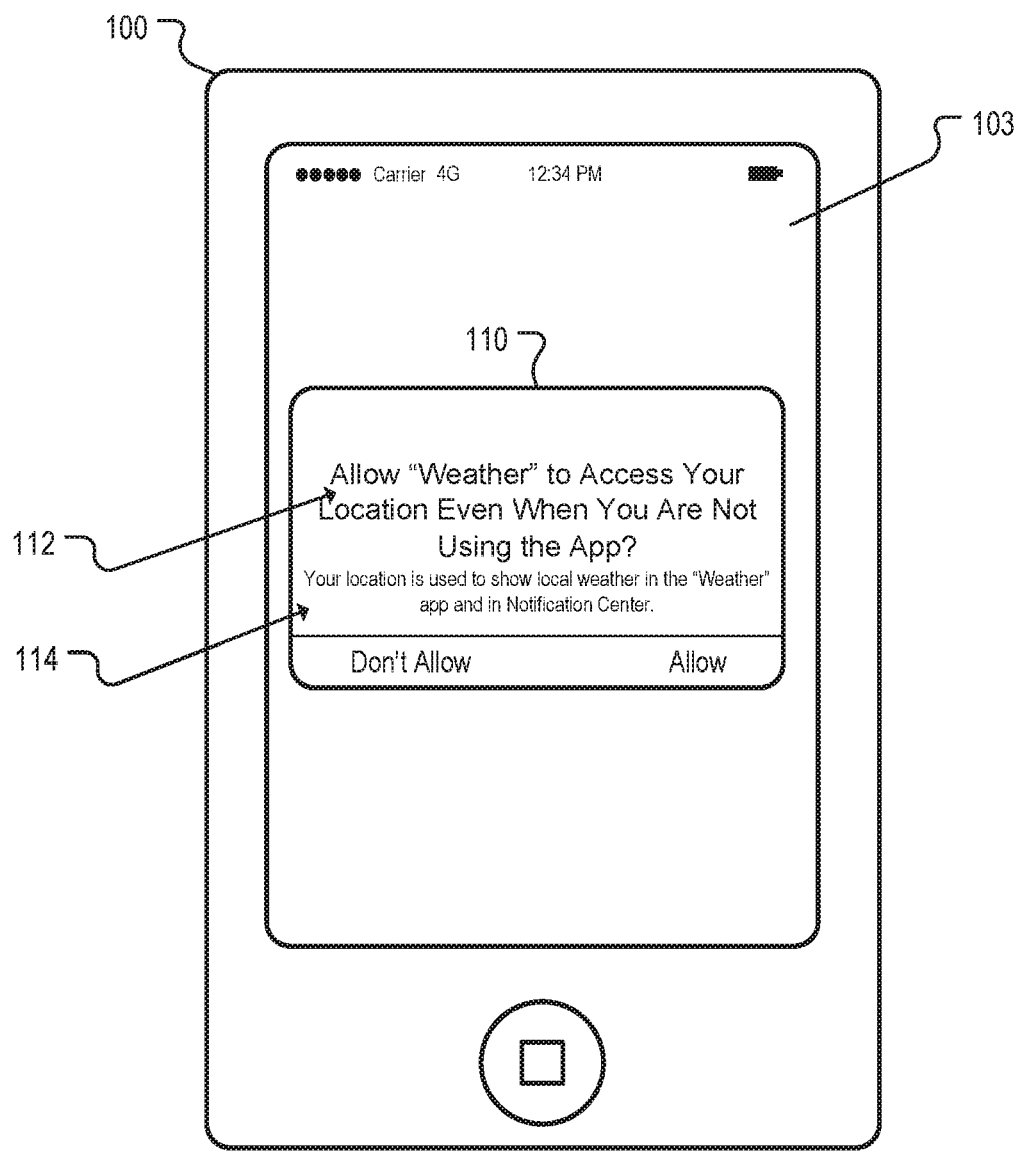
FIG. 1B illustrates an example authorization dialog to allow an application to always receive location service.

FIG. 1B illustrates an example authorization dialog to always allow a weather application to receive location service. The operating system provided generic text 112 in GUI 103: "Allow 'Weather' to Access Your Location While You Use the App?" The weather application provided customer text 114: "Your location is used to show local weather in the 'Weather' app and in Notification Center." Custom text 114 provided by the weather application addresses the user's privacy concerns about their location data being shared with third parties. The user is provided with user interface elements (e.g., "Don't Allow" and "Allow" buttons) to allow or not allow the weather application to use the location data. In some implementations, authorization dialog 110 is displayed only once after the weather application is launched for the first time after installation or reinstallation of the weather application.

Figure 1C:
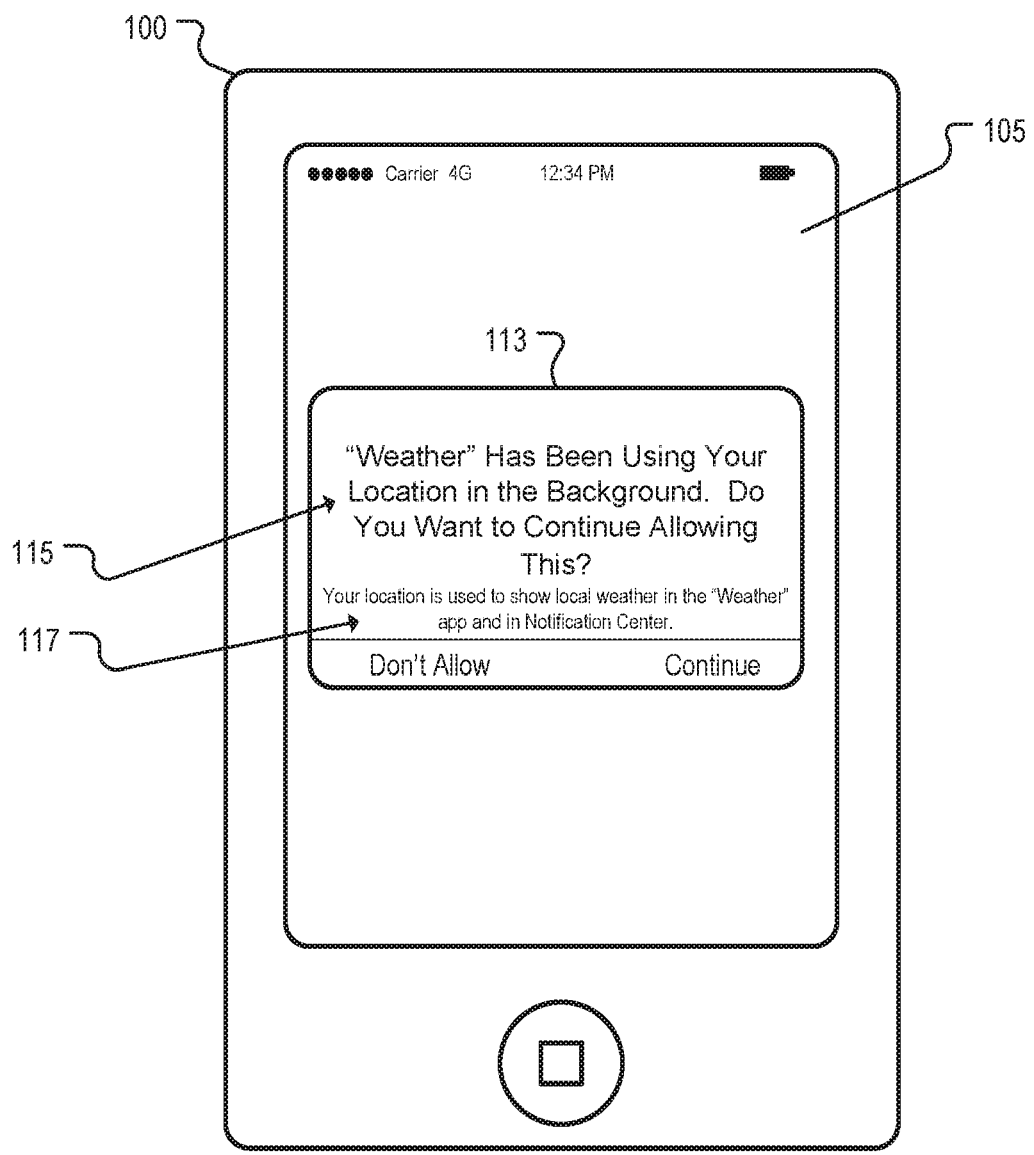
FIG. 1C illustrates an example reminder authorization dialog to allow an application to always receive location service.

FIG. 1C illustrates an example reminder authorization dialog 113 to allow a weather application to continue to always receive location service. Reminder authorization dialog 113 is a delayed (e.g., several days later) reminder to the user that is presented in GUI 105 of mobile device 100, only if the application specifies the Always authorization type and the user had previously authorized the location service. In some implementations, a display of mobile device 100 presents GUI 105 of a weather application. The operating system may present the authorization dialog 113 in GUI 105 at an appropriate time. Authorization dialog 113 includes generic text 115 provided by the operating system of mobile device 100 and custom text 117 provided by the weather application.

In the example shown, the operating system provided the generic text "'Weather' Has Been Using Your Location in the Background. Do you want to Continue Allowing this?" and the weather application provided the custom text "Your current location is used to show local weather in the 'Weather' app and in Notification Center." The user is provided with user interface elements (e.g., "Don't Allow" and "Continue" buttons) to allow or not allow the weather application to use the location data.

Figure 1D:
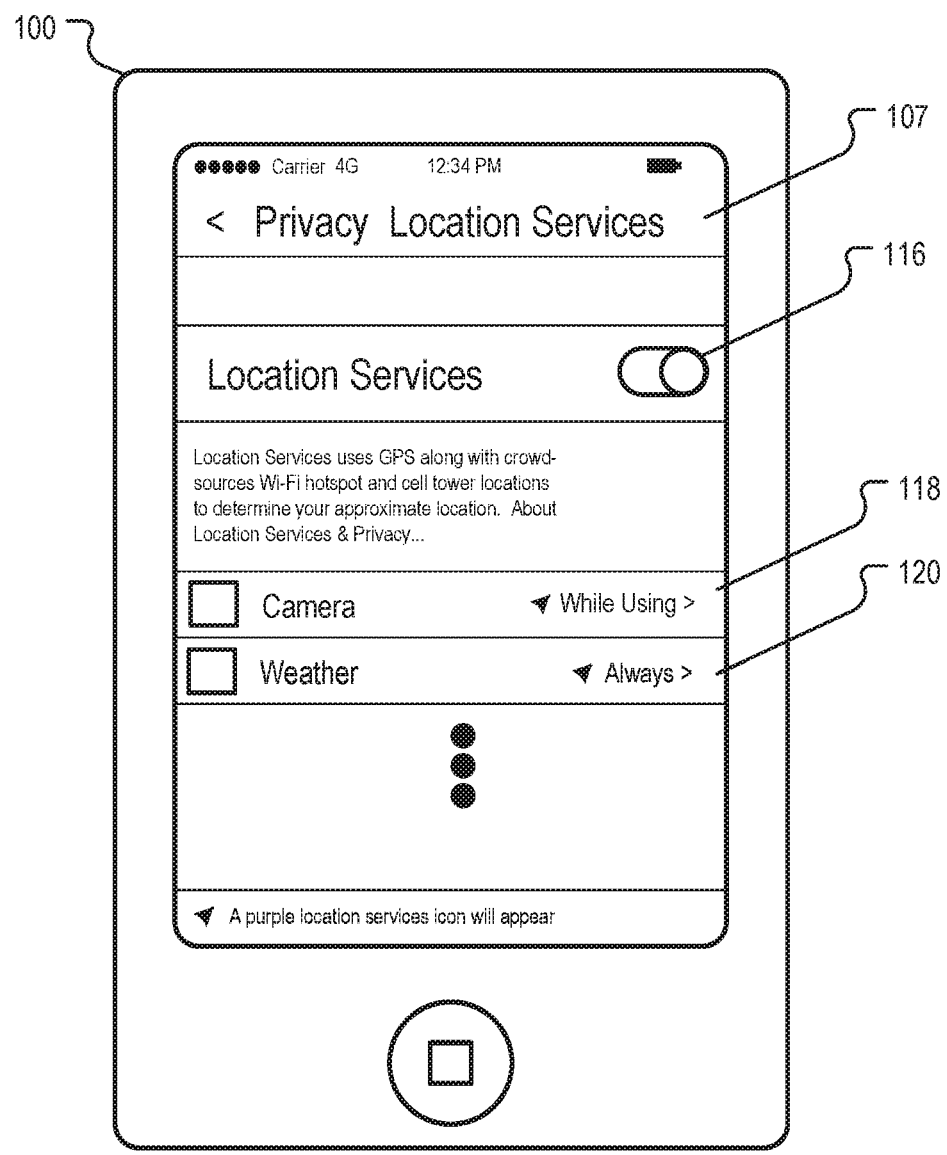
FIG. 1D illustrates an example settings pane that allows a user to specify a location service authorization type for an application.

FIG. 1D illustrates an example settings pane that allows a user to specify a location service authorization type for an application. In some implementations, a user can specify a location service authorization type using GUI 107. GUI 107 can provide a user interface element 116 for allowing the user to turn off location service for all applications. GUI 107 can also include user interface elements 118, 120 corresponding to the camera and weather applications, respectively, which allow the user to specify one of the WhenInUse and Always location service authorization types for the corresponding application. Accordingly, the user may use elements 118, 120 to override the location service authorization type granted by the user.

Figure 1E:
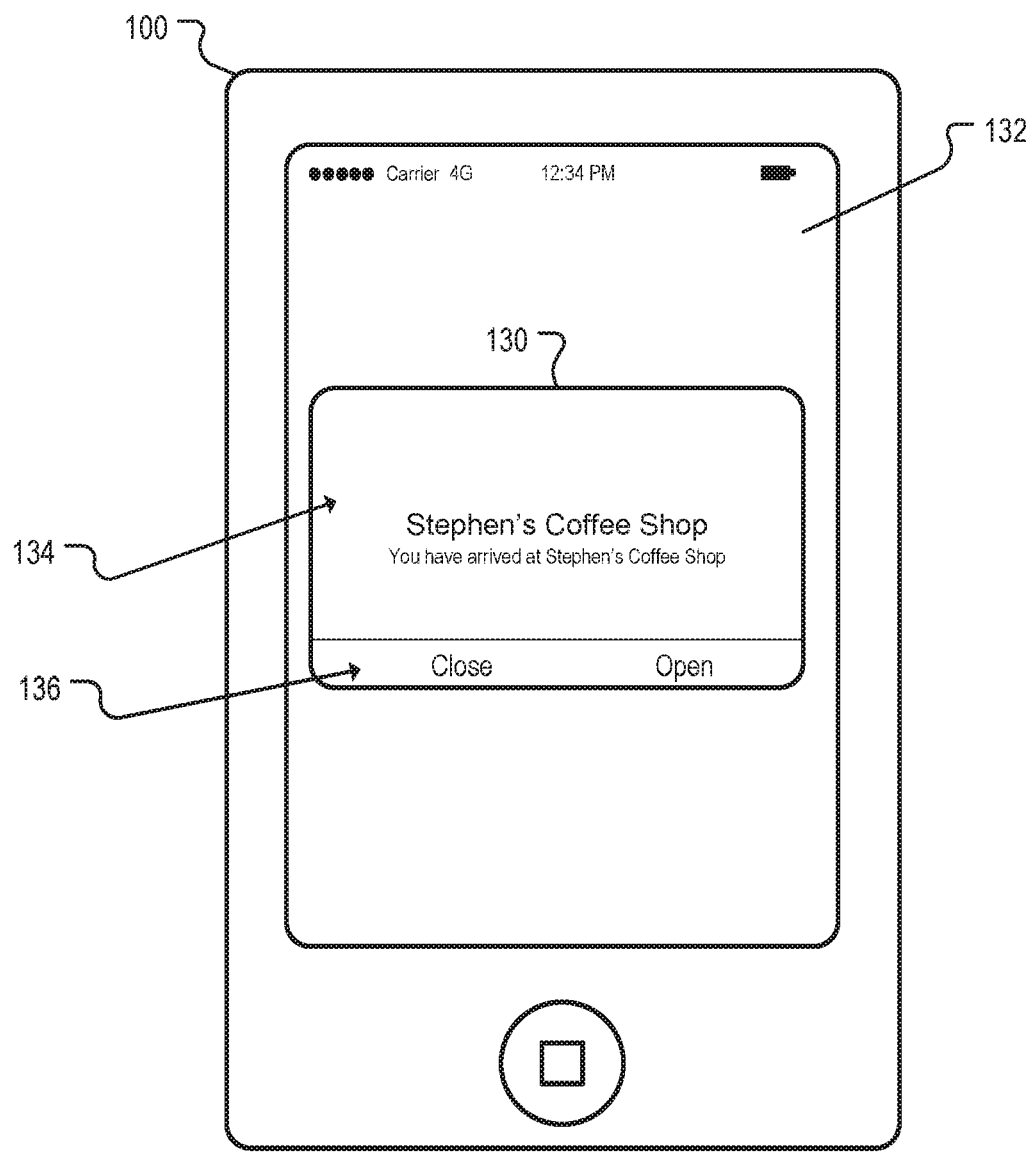
FIG. 1E illustrates an example user alert to allow an application to receive a location notification.

FIG. 1E illustrates an example user alert to allow an application to receive a location notification. User alert 130 can be presented in GUI 132 of mobile device 100, when a location subsystem of mobile device 100 is about to notify an application of a crossing of a geofence. User alert 130 can include an application-specific prompt that allows a user to open the application.

In the example shown, an application "Stephen's Coffee Shop" pre-registered with the location subsystem to receive notification of geofence crossing. The location subsystem detects a crossing of the geofence. Mobile device 100 can display user alert 130 including text 134 identifying the application. The application can provide the customizable text "You've arrived at Stephen's Coffee Shop." The user is provided with user interface elements 136 (e.g., "Close" and "Open" buttons) to close the alert or open the application.

Example System

Figure 2:
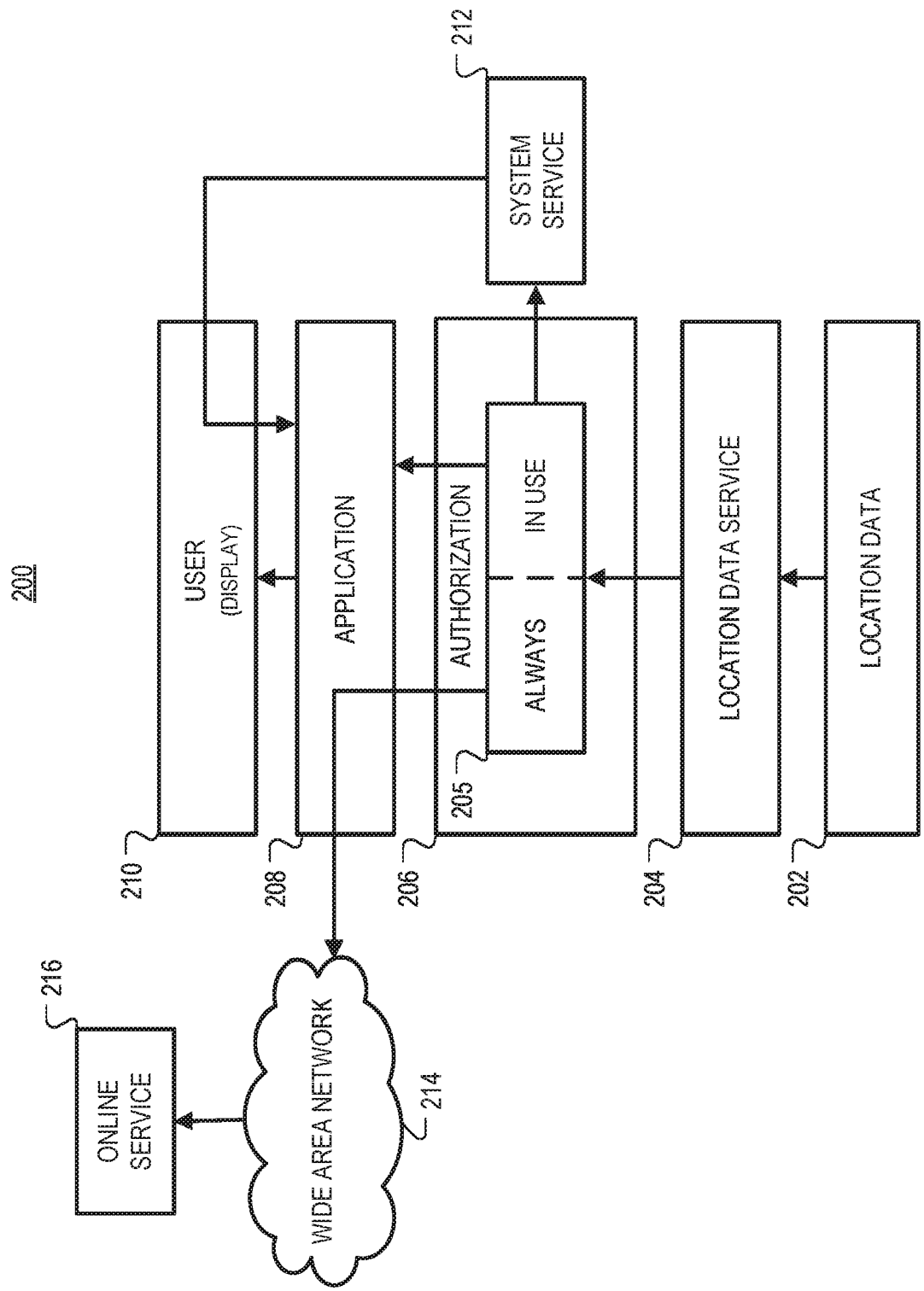
FIG. 2 is a conceptual diagram illustrating a system for location service authorization and indication.

FIG. 2 is a conceptual diagram illustrating system 200 for location service authorization and indication. In some implementations, system 200 is implemented by a software stack installed on mobile device 100. Location data 202 is collected by location service 204, which provides the location data 202 to application 208 based on the location service authorization type that is currently enforced by authorization module 205, which can be included in location service module 206. Location data 202 can be provided by one or more position systems of mobile device 100 including satellite-based positioning systems (e.g., GPS) and network-based positioning systems (e.g., Wi-Fi™ cellular).

If an Always authorization type is enforced by authorization module 205, location data 202 is provided by location service 204 to application 208 when application 208 is running in the foreground or background on mobile device 100. Application 208 may send location data 202 to online service 216 (e.g., Facebook®) through network 214 (e.g., the Internet).

If a WhenInUse authorization type is enforced by authorization module 205, when application 208 is in use (e.g., its GUI is displayed), then location service 204 can send location data 202 directly to application 208, where it can be displayed to user 210. If application 208 is not in use, system service 212 can involve the user so that the user can bring application 208 into use and provide location data 202 to application 208. For example, a notification can be displayed that can be selected by the user to bring application 208 back into use. In this case, application 208 can choose to send location data 202 to online service 216 because the user knows application 208 is in use, as opposed to the case when Always authorization is enforced and the user may not be aware that application 208 is running and has received location data 202.

Figure 3A:
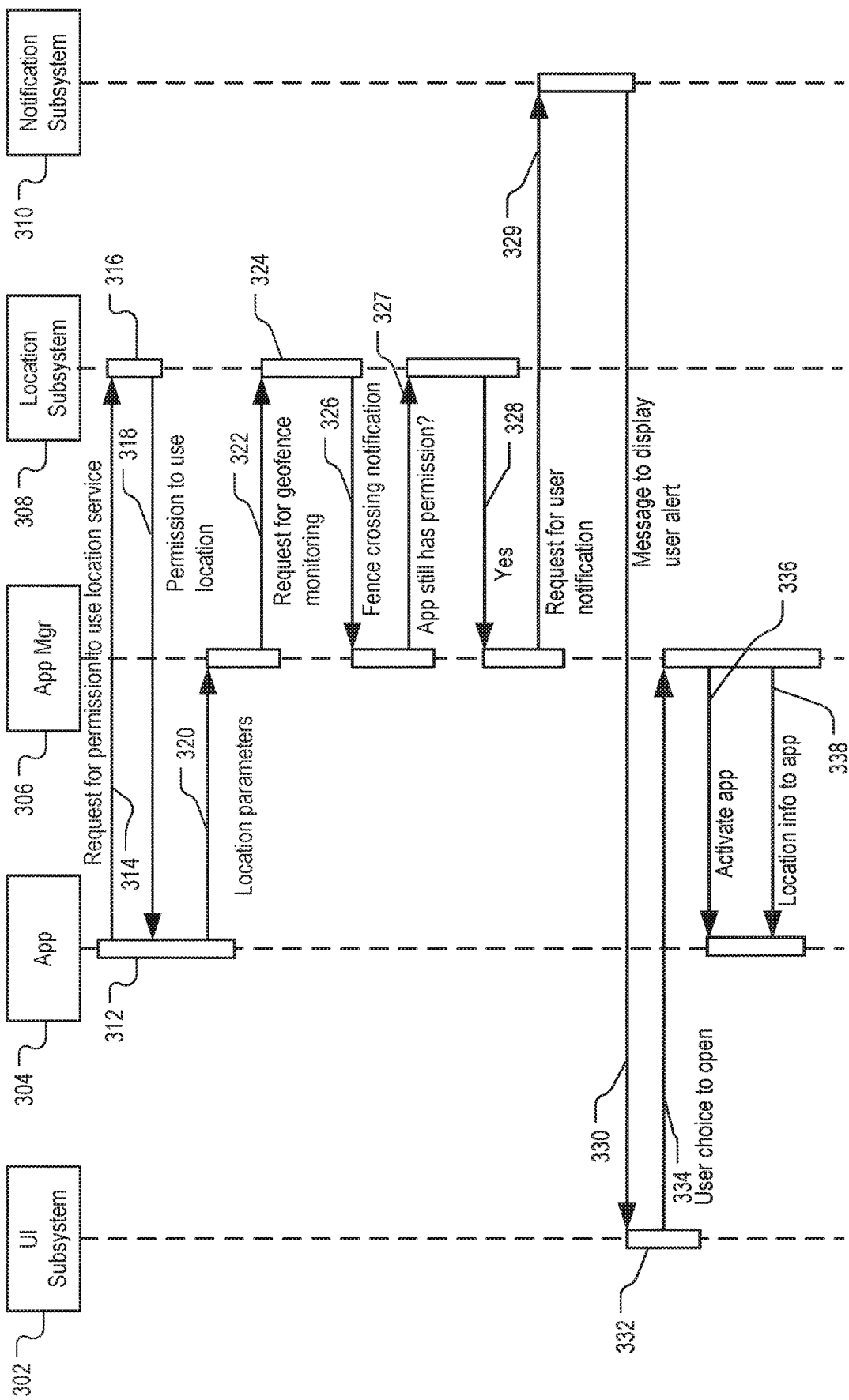
FIGS. 3A and 3B are interaction diagrams illustrating interactions between example subsystems of a mobile device.
Figure 3B:
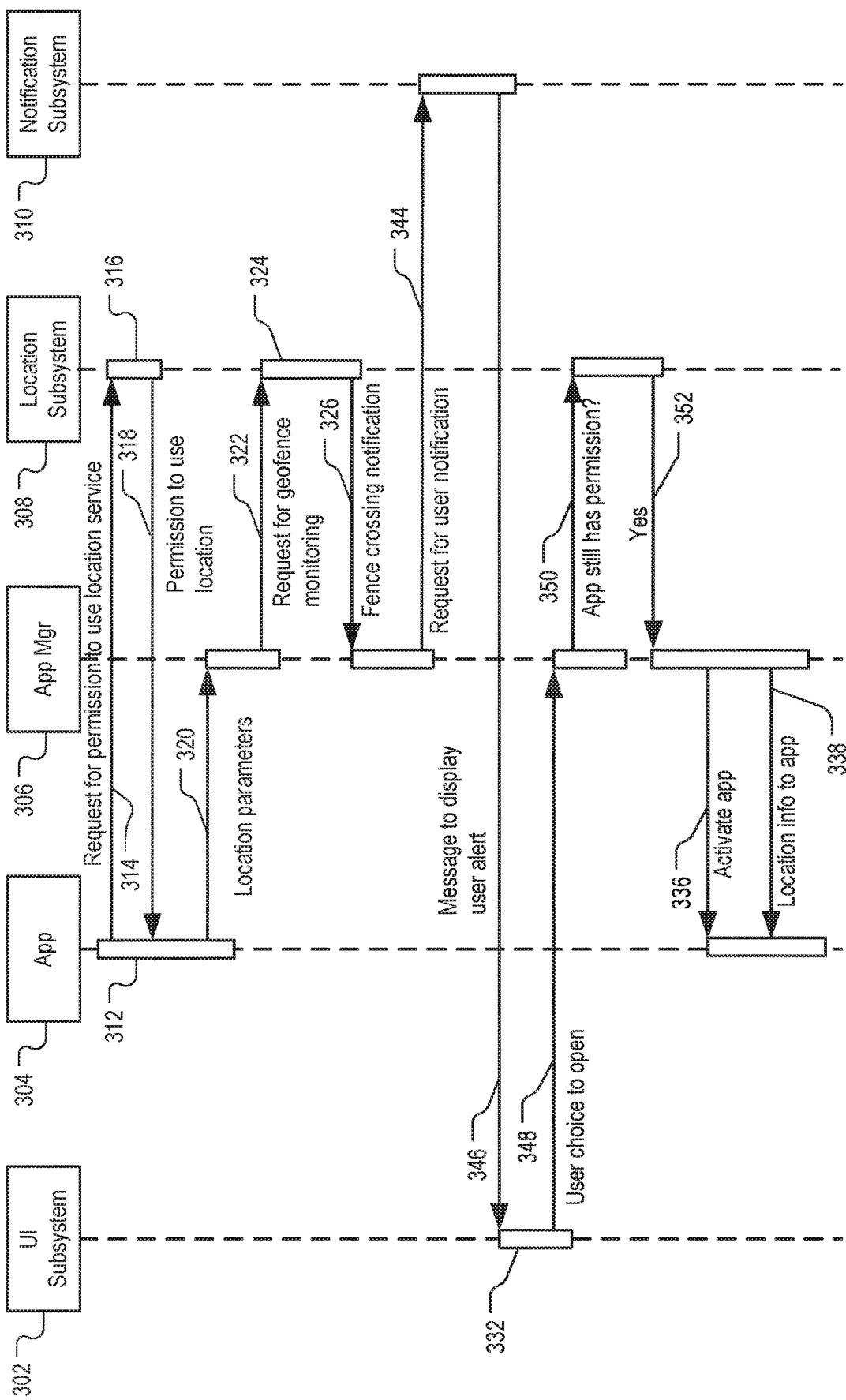

FIGS. 3A and 3B are interaction diagrams illustrating interactions between example subsystems of a mobile device. The mobile device can be mobile device 100 as described above in reference to FIGS. 1A-1D. Each subsystem of mobile device 100 can include at least one of hardware, software, or firmware components.

Mobile device 100 can include user interface (UI) subsystem 302. UI subsystem 302 is a component of mobile device 100 configured to provide various user interface items, e.g., dialog windows, sound alerts, vibration outputs configured to provide information to the user and receive input from the user through voice input, touch screen, or physical buttons.

Mobile device 100 can store application 304. Application 304 can include a computer program that interacts with various subsystems of mobile device 100. Application 304 can have a feature that is related to a geofence and is configured to activate, or to perform certain functions, upon entry into or exit from a geofence by mobile device 100.

Mobile device 100 can include application management subsystem 306. Application management subsystem 306 is a component of mobile device 100 configured to manage interactions between application 304 and location services provided by mobile device 100, including to intercept a location notification to application 304.

Mobile device 100 can include location subsystem 308. Location subsystem 308 is a component of mobile device 100 configured to provide various location services, including to determine a location of mobile device 100 using various technologies, e.g., Wi-Fi signals or GPS signals, and to determine whether mobile device 100 crossed a geofence.

Mobile device 100 can include notification subsystem 310. Notification subsystem 310 can be a component of an operating system of mobile device 100 or a component that is controlled by an operating system of mobile device 100. Notification subsystem 310 can be configured to provide notifications to a user through UI subsystem 302.

Referring to FIG. 3A. During execution 312 of application 304, application 304 can submit request 314 to location subsystem 308. Request 314 can indicate a message seeking permission to use one or more services of location subsystem 308. In response to request 314, location subsystem 308 can determine (316) whether to permit application 304 to use location service provided by location subsystem 308. Determining whether to permit application 304 to use location service can include sending a message to UI subsystem 302 to display an alert, e.g., user alert 130 of FIG. 1E, receiving a user input through UI subsystem 302, and permit or deny request 314 according to the user input. If the user approves, location subsystem 308 can provide permission 318 to application 304.

Upon receiving permission 318, application 304 can submit location parameters 320 to application management subsystem 306. Location parameters 320 can include one or more of a location, a size, an identifier, or shape in the form of a polygon, of a geofence. The geofence can enclose a two-dimensional or three-dimensional geographic area. Application management subsystem 306 can act as an intermediary between application 304 and location subsystem 308. Upon receiving location parameter 320, application management subsystem 306 can send request 322 for geofence monitoring to location subsystem 308. Request 322 can specify the geofence for location subsystem 308 to monitor. Request 322 can include information on the geofence, as well as information associating the geofence with application 304, to location subsystem 308. In response to request 322, location subsystem 308 can monitor (324) the geofence specified in request 322. During monitoring, application 304 can pause execution, for example, by termination or by entering a background execution mode.

Upon detecting a crossing of the geofence specified in request 322, location subsystem 308 can submit fence crossing notification 326 to application management subsystem 306. In response to fence crossing notification 326, application management subsystem 306 can submit query 327 to location subsystem 308, inquiring whether application 304 still has permission to use location information. Application management subsystem 306 can submit query 327 synchronously where application management subsystem 306 waits for a reply. Application management subsystem 306 can submit query 327 asynchronously, handling other processes until a reply comes back from location subsystem 308. Location subsystem 308 can respond by sending reply 328 to application management subsystem 306. Reply 328 can indicate that application 304 still has permission. In response, application management subsystem 306 can submit request 329 for user notification to notification subsystem 310. In response to request 329, notification subsystem 310 can submit message 330 to UI subsystem 302 for presenting a user alert. UI subsystem 302 can present (332) a notification to a user in response to message 330 in various ways, including, for example, by displaying user alert 130 as described above in reference to FIG. 1E.

Application management subsystem 306 can receive input from UI subsystem 302 indicating whether a user chose to open the application. Upon receiving a user input closing application 304 through UI subsystem 302, application management subsystem 306 can prevent application 304 from being activated. If the user chooses to open application 304, UI subsystem 302 can provide user approval 334 to application management subsystem 306. In response to user approval 334, application management subsystem 306 can activate (336) application 304 if application 304 is not already activated. Activating application 304 can include, for example, launching application 304 or bringing application 304 from a background execution mode to a foreground execution mode. Application management subsystem 306 can then provide location information 338 to application 304. Location information 338 can include the notification of geofence crossing, as requested by application 304.

Referring to FIG. 3B, which corresponds to an alternative implementation of the features described in reference to FIG. 3A. In response to fence crossing notification 326, application management subsystem 306 can submit request 344 for user notification to notification subsystem 310. In response to request 344, notification subsystem 310 can submit message 346 to UI subsystem 302 for presenting a user alert. UI subsystem 302 can present (332) a notification to a user in response to message 346 in various ways, including, for example, by displaying user alert 130 as described above in reference to FIG. 1E.

Application management subsystem 306 can receive input 348 from UI subsystem 302 indicating whether a user chose to open the application. If the user chooses to open application 304, application manager subsystem can submit query 350 to location subsystem 308, inquiring whether application 304 still has permission to use location information. Application management subsystem 306 can submit query 350 synchronously where application management subsystem 306 waits for a reply. Application management subsystem 306 can submit query 350 asynchronously, handling other processes until a reply comes back from location subsystem 308. Location subsystem 308 can respond by sending reply 352 to application manager 306. Reply 352 can indicate that application 304 still has permission or not. In response, application manager 306 activates (336) application 304 if application 304 is not already activated. Application management subsystem 306 can then provide location information 338 to application 304 if reply 352 indicates that application 304 still has permission, or do not provide location information 338 if reply 352 indicates otherwise.

In some implementations, the operations of FIG. 3A and the operations of FIG. 3B can be combined. Application management subsystem 306 can submit query 327 before requesting notification, and then submit query 350 after requesting notification.

Example Processes

Figure 4:
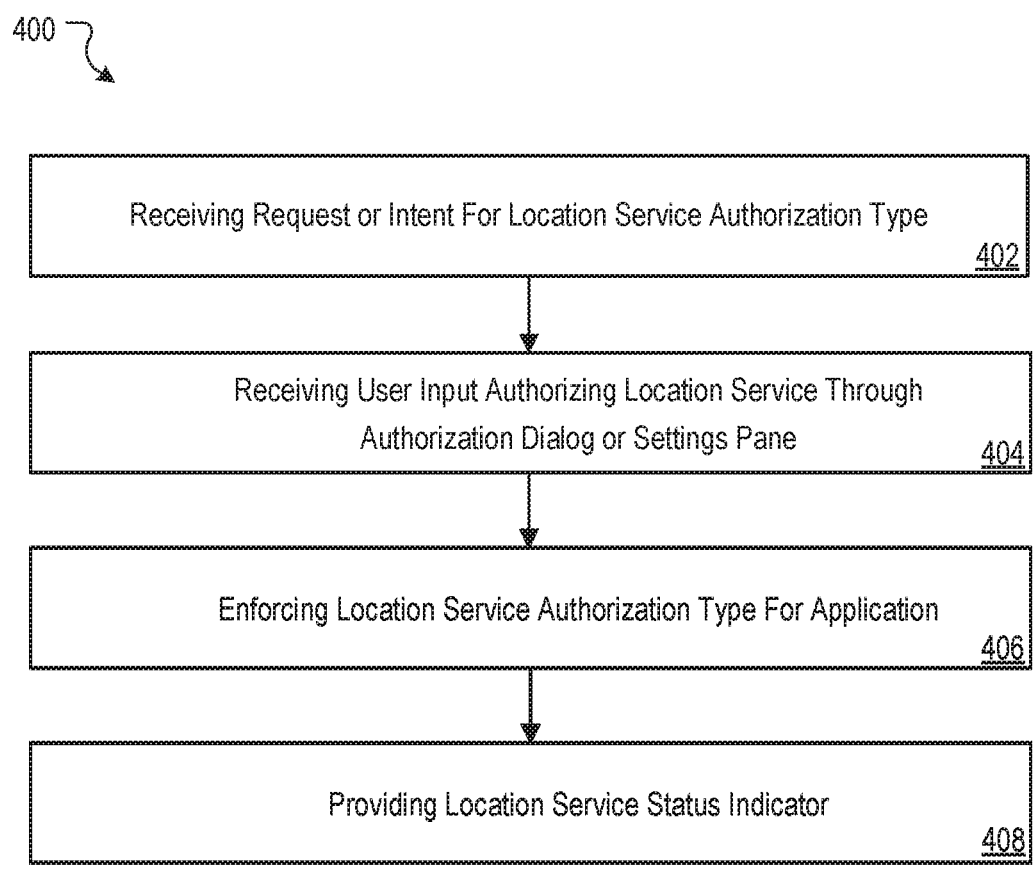
FIG. 4 is a flowchart of example process for location service authorization and indication.

FIG. 4 is a flowchart of example process 400 for location service authorization and indication. Process 400 can be implemented using the architecture described in reference to FIG. 6.

In some implementations, process 400 can begin by receiving a request or intent for a location service authorization type (402). The location service authorization type can be specified by an application through an API. In some implementations, the location service authorization type can be determined statically using metadata of the application. For example, the location service authorization type can be specified by one or more keys in a file of the application. For example, for mobile devices running iOS operating system developed by Apple Inc. (Cupertino, Calif.), an info.plist of an application installed on the mobile device can set one of the keys NSLocationWhenInUseUsageDescription or NSLocationAlwaysUsageDescription. The keys indicate what the application may do in the future, which causes, for example, the settings pane shown in FIG. 1D to include a user interface element for the application.

In addition to the keys in the info.plist, an authorization request API is called with one of the API parameters requestWhenInUseAuthorization or requestAlwaysAuthorization set. The API parameters inform the system what the application wants to request from the user. Other location service authorization types are also possible. In some implementations, a default location service authorization type can be enforced if not specified by an application or the user.

Process 400 can continue by receiving user input authorizing the location service through an authorization dialog or settings pane (FIG. 1D) according to the location service authorization type (404). The authorization dialog can include generic or default text provided by an operating system of the mobile device and custom text provided by the application. Generic text can be specific to the location authorization type to be enforced for the application. Custom text can describe how the location data will be used by the application. The authorization dialog can include one or more user interface elements that can be selected by the user to allow or not allow the application to receive location data.

Process 400 can continue by enforcing the location service authorization type for the application (406). For example, an authorization module can determine when an application is requesting location data and based on the location service authorization type enforced for the application, determine whether to provide the location data to the application ("Always"). If the application does not meet the WhenInUse constraints, an operating system service can still provide the location service to the user without providing the location service to the application so that the user need not trust the application to be the direct recipient of the location service.

Process 400 can continue while the application is running and receiving location data by displaying a status indicator (408) on the display of the mobile device. The status indicator (e.g., an icon) can have a first visual appearance (e.g., a solid icon) based on a first location service type (e.g., foreground or background location data use, ranging, significant location changes) and a second visual appearance (e.g., a hollow icon) based on a second location service type (e.g., region/geofence monitoring).

In some implementations, if a WhenInUse application which is actively tracking the user's location ceases to be visible to the user (e.g., the user is using a different application in the foreground) a status indicator (e.g., a banner display) can be presented in the GUI that when selected by the user (e.g., touched by the user), provides a quick return back to the WhenInUse application if the application is still using the location service. The status indicator allows the user to return to the application more quickly and also prevents applications from doing this surreptitiously. For example, certain applications (e.g., an exercise tracker application) is considered "in use" even when not running in the foreground.

Figure 5:
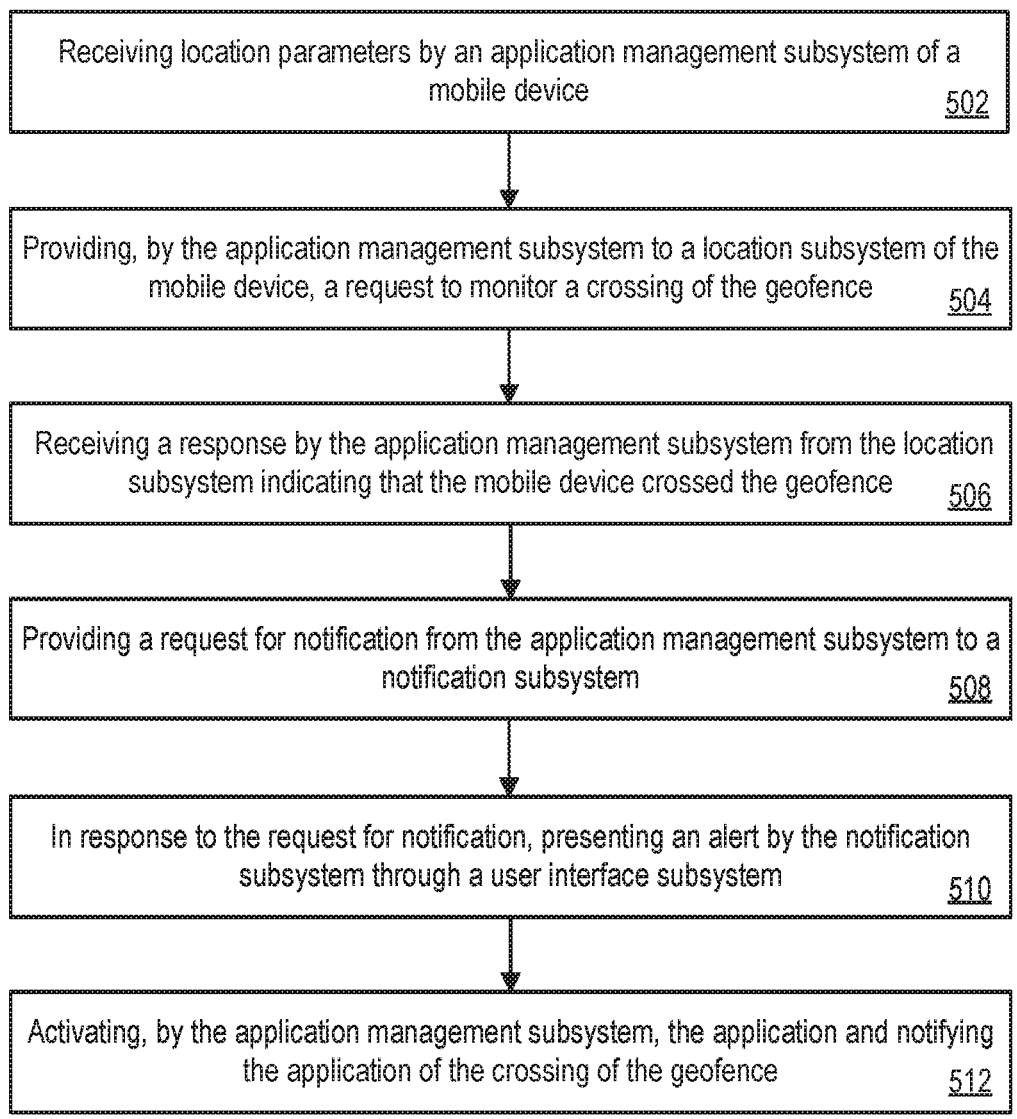
FIG. 5 is a flowchart of an example process of location service management.

FIG. 5 is a flowchart of example process 500 of location service management. Process 500 can be implemented using the architecture described in reference to FIG. 6.

An application management subsystem of a mobile device, e.g., application management subsystem 306 of FIG. 3, can receive (502) location parameters from an application executing on the mobile device, e.g., application 304 of FIG. 3. The application can be requesting to be notified upon crossing a geofence by the mobile device. The location parameters can include information on the geofence. The information on the geofence can include at least one of a location of the geofence or an identifier of the geofence.

In some implementations, before the application management subsystem receives the location parameters, the location subsystem can receive, from the application, a request for permission to use location information. The location subsystem can provide a response indicating that the application is permitted to use the location information. The response can trigger the application to submit the location parameters to the application management subsystem. The application can enter an inactive state after submitting the location parameters to the application management subsystem. Entering the inactive state can include setting the application to a background execution mode or terminating the application.

Providing the response indicating that the application is permitted to use the location information can be triggered by a user input. In response to the request for permission to use location information received by the location subsystem from the application, the location subsystem can cause a user interface subsystem of the mobile device, e.g., the user interface subsystem 302 of FIG. 3, to present an application dialog. The location subsystem can receive a user input through the user interface subsystem approving the request to use location information. Then, the location subsystem can provide the response indicating that the application is permitted to use the location information to the application.

The application management subsystem can provide (504), to a location subsystem of the mobile device, e.g., location subsystem 508 of FIG. 3, a request to monitor a crossing of the geofence. The request can trigger the location subsystem to monitor a location of the mobile device to determine whether the mobile device crossed the geofence.

Upon detecting the crossing, the location subsystem can notify the application subsystem by sending a response. The application management subsystem can receive (506) the response from the location subsystem indicating that the mobile device crossed the geofence.

The application management subsystem can provide (508) a request for notification to a notification subsystem of the mobile device, e.g., notification subsystem 310 of FIG. 3, requesting the notification subsystem to notify a user of the mobile device that communication between the location subsystem and the application is about to occur.

In response to the request for notification, the notification subsystem can present (510) an alert through a user interface subsystem of the mobile device, e.g., user interface subsystem 302 of FIG. 3. The alert, e.g., user alert 130 of FIG. 1, can include information for the user to open the application.

Upon receiving, by the application management subsystem and from the user interface subsystem, an input opening the application, the application management subsystem can activate (512) the application and notify the application of the crossing of the geofence. Activating the application can include launching the application or changing an execution mode of the application from a background execution mode to a foreground execution mode. Notifying the application of the crossing of the geofence can be conditioned on a second permission check. In the second permission check, the application subsystem can send a query to the location subsystem inquiring whether the application still has permission to use location information. The application management subsystem notifies the application of the crossing only if the location subsystem replies to the query and indicates that the application still has permission to use location information.

Example Architecture

Figure 6:
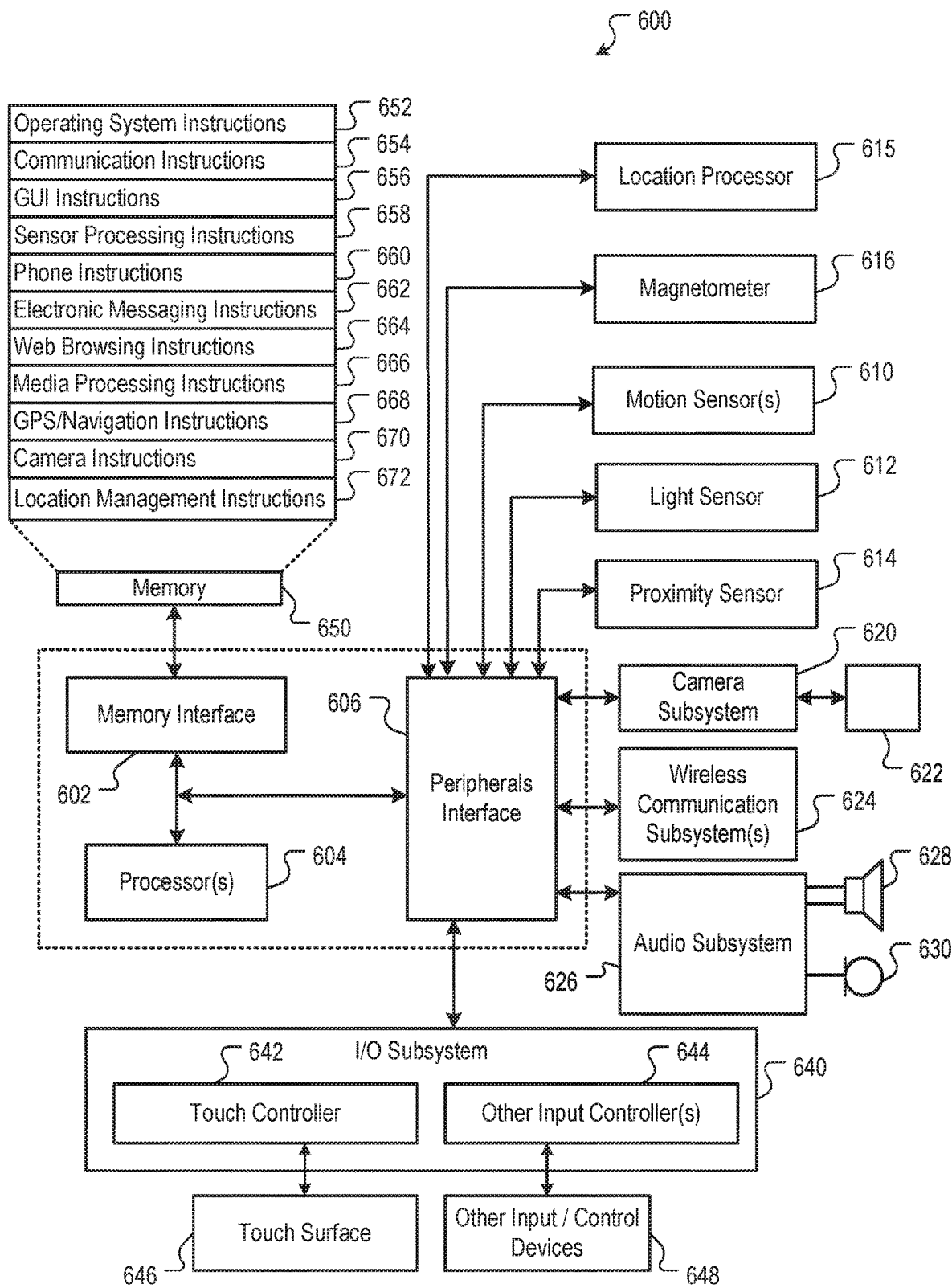
FIG. 6 is a block diagram of example client device architecture for implementing the features and processes described in reference to FIGS. 1-5.

FIG. 6 is a block diagram of example architecture for a mobile device, as described in reference to FIGS. 1-5. Architecture 600 may be implemented in mobile device 100 for performing the features described in reference to FIGS. 1-5, including but not limited to portable computers, smart phones and tablet computers, game consoles, wearable computers and the like. Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor 610, light sensor 612, and proximity sensor 614 may be coupled to peripherals interface 606 to facilitate orientation, lighting, and proximity functions of the device. For example, in some implementations, light sensor 612 may be utilized to facilitate adjusting the brightness of touch surface 646. In some implementations, motion sensor 610 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 606, such as a temperature sensor, a biometric sensor, or other sensing device, to facilitate related functionalities.

Location processor 615 (e.g., GPS receiver chip) may be connected to peripherals interface 606 to provide geo-referencing. Electronic magnetometer 616 (e.g., an integrated circuit chip) may also be connected to peripherals interface 606 to provide data that may be used to determine the direction of magnetic North. Thus, electronic magnetometer 616 may be used with an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 624 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 626 may be coupled to a speaker 628 and one or more microphones 630 to facilitate voice-enabled functions, such as voice recognition, voice replication, digital recording, and telephony functions.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 646. In one implementation, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, device implementing architecture 600 may present recorded audio and/or video files, such as MP3, AAC, and MPEG video files. In some implementations, device implementing architecture 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers, including peer-to-peer communications, as described in reference to FIGS. 1-6. Communication instructions 654 may also be used to select an operational mode or communication medium for use by the device, based on a geographic location (obtained by the GPS/Navigation instructions 668) of the device. Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes; camera instructions 670 to facilitate camera-related processes and functions; and location management instructions 672 for performing some or all of the operations as described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a location subsystem of a mobile device, from an application executing on the mobile device, a request for permission to use location information related to the mobile device;
providing, by the location subsystem, a response indicating that the application is permitted to use the location information in response to a determination that the location subsystem has received an input to enable the application to access the location information wherein the application is determined to be enabled to access the location information in accordance with a location service authorization type for the application;
receiving a request to monitor a geofence, wherein the request is associated with the application; and
providing for the application, by the location subsystem, an indication that the mobile device has crossed the geofence.

2. The method of claim 1, further comprising presenting a user interface that enables adjustment of the location service authorization type for the application.

3. The method of claim 2, wherein the location service authorization type for the application indicates that the application is to be permitted to use the location information while the application is in use on the mobile device or while the application is running in a background execution mode on the mobile device.

4. The method of claim 3, further comprising providing the indication that the mobile device has crossed the geofence in response to a determination that the application is in an execution mode that is consistent with the location service authorization type for the application.

5. The method of claim 4, further comprising entering an inactive state by the application after submitting the request for permission to use the location information.

6. The method of claim 5, wherein entering the inactive state includes setting the application to a background execution mode or terminating the application.

7. The method of claim 6, further comprising, before providing the indication that the mobile device has crossed the geofence, activating the application via an application management subsystem when the location service authorization type indicates that the application is permitted to use the location information while the application is running in a background execution mode.

8. The method of claim 7, wherein activating the application includes launching the application or changing an execution mode of the application from a background execution mode to a foreground execution mode.

9. The method of claim 1, additionally comprising, before receiving the request for permission to use the location information:
  receiving, by the location subsystem, a request to enable the application to use the location information related to the mobile device;
  in response to the request to enable the application to use location information related to the mobile device, causing a user interface subsystem of the mobile device to present an application dialog by the location subsystem;
  receiving, by the location subsystem, input from the user interface subsystem approving the request to use location information; and
  providing, by the location subsystem and to the application, the response indicating that the application is permitted to use the location information.

10. The method of claim 9, wherein the input from the user interface subsystem approving the request to use location information indicates a location service authorization type for the application.

11. A system on a mobile device, the system comprising:
  one or more processors;
  memory coupled to the one or more processors and configured to store instructions, which, when executed by the one or more processors, causes the one or more processors to:
    receive, by a location subsystem of the mobile device, from an application executing on the mobile device, a request for permission to use location information related to the mobile device;
    provide, by the location subsystem a response to indicate that the application is permitted to use the location information in response to a determination that the location subsystem has received an input to enable the application to access the location information, wherein the application is determined to be enabled to access the location information in accordance with a location service authorization type for the application;
    receive a request to monitor a geofence, wherein the request is associated with the application; and
    provide for the application, by the location subsystem, an indication that the mobile device has crossed the geofence.

12. The system of claim 11, wherein the request to monitor the geofence includes a location of the geofence or an identifier of the geofence.

13. The system of claim 11, the one or more processors to present a user interface to enable adjustment of the location service authorization type for the application.

14. The system of claim 13, wherein the location service authorization type for the application indicates that the application is to be permitted to use the location information while the application is in use on the mobile device or while the application is running in a background execution mode on the mobile device.

15. The system of claim 14, wherein the one or more processors are additionally to provide the indication that the mobile device has crossed the geofence in response to a determination that the application is in an execution mode that is consistent with the location service authorization type for the application.

16. A non-transitory storage device storing instructions that, when executed by one or more processors, cause the one or more processors of a mobile device to perform operations comprising:
  receiving, by a location subsystem of the mobile device, from an application executing on the mobile device, a request for permission to use location information related to the mobile device;
  providing, by the location subsystem a response indicating that the application is permitted to use the location information in response to a determination that the location subsystem has received an input to enable the application to access the location information, wherein the application is determined to be enabled to access the location information in accordance with a location service authorization type for the application;
  receiving a request to monitor a geofence, wherein the request is associated with the application; and
  providing for the application, by the location subsystem, an indication that the mobile device has crossed the geofence.

17. The non-transitory storage device of claim 16, further comprising presenting a user interface that enables adjustment of the location service authorization type for the application.

18. The non-transitory storage device of claim 17, wherein the location service authorization type for the application indicates that the application is to be permitted to use the location information while the application is in use on the mobile device or while the application is running in a background execution mode on the mobile device.

19. The non-transitory storage device of claim 18, the operations further comprising providing the indication that the mobile device has crossed the geofence in response to a determination that the application is in an execution mode that is consistent with the location service authorization type for the application.

20. The non-transitory storage device of claim 19, the operations further comprising:
  entering an inactive state by the application after submitting the request for permission to use the location information, wherein entering the inactive state includes setting the application to a background execution mode or terminating the application; and
  before providing the indication that the mobile device has crossed the geofence, activating the application via an application management subsystem when the location service authorization type indicates that the application is permitted to use the location information while the application is running in a background execution mode, wherein activating the application includes launching the application or changing an execution mode of the application from a background execution mode to a foreground execution mode.

* * * * *